United States Patent
Oe et al.

(10) Patent No.: US 12,529,570 B2
(45) Date of Patent: Jan. 20, 2026

(54) NAVIGATION SYSTEM

(71) Applicants: TOYOTA JIDOSHA KABUSHIKI KAISHA, Toyota (JP); Nomura Research Institute, Ltd., Tokyo (JP)

(72) Inventors: Yoshihiro Oe, Nagoya (JP); Wataru Minoura, Nagoya (JP); Masatoshi Hayashi, Nisshin (JP); Yutaro Imamura, Nagoya (JP); Fumihiro Nasu, Nagoya (JP); Yuki Tatsumoto, Seto (JP); Takehiko Hashimoto, Tokyo (JP)

(73) Assignees: TOYOTA JIDOSHA KABUSHIKI KAISHA, Toyota (JP); Nomura Research Institute, Ltd., Tokyo (JP)

( * ) Notice: Subject to any disclaimer, the term of this patent is extended or adjusted under 35 U.S.C. 154(b) by 111 days.

(21) Appl. No.: 18/674,161

(22) Filed: May 24, 2024

(65) Prior Publication Data

US 2025/0012586 A1    Jan. 9, 2025

(30) Foreign Application Priority Data

Jul. 7, 2023 (JP) ................................ 2023-112124

(51) Int. Cl.
*G05D 1/00*     (2024.01)
*G01C 21/36*    (2006.01)
*G06Q 30/0207*  (2023.01)

(52) U.S. Cl.
CPC ..... *G01C 21/3602* (2013.01); *G01C 21/3647* (2013.01); *G01C 21/3697* (2013.01); *G06Q 30/0207* (2013.01)

(58) Field of Classification Search
CPC .................................................. G01C 21/3602
See application file for complete search history.

(56) References Cited

U.S. PATENT DOCUMENTS

2020/0317201 A1    10/2020   Takemura et al.

FOREIGN PATENT DOCUMENTS

JP         2020-170314 A    10/2020

*Primary Examiner* — Vivek D Koppikar
*Assistant Examiner* — Paul W Arellano
(74) *Attorney, Agent, or Firm* — Sughrue Mion, PLLC (57) ABSTRACT

In a navigation system, a data center and a plurality of vehicles are connected via a communication network. The data center accepts specific section information, which can identify a specific section for which the capturing of road conditions is requested, from a capturing requester. The data center proposes capturing-requested routes, each of which goes through a specific section, to a user who performed a route search with a destination set using a navigation device, based on the specific section information. The data center stores, in a storage device, a video that was uploaded by a user, that was captured by a dashcam while the vehicle was traveling in the specific section, and that shows the road conditions of the specific section, along with capturing position information that can identify the position where the video was captured.

2 Claims, 5 Drawing Sheets

NAVIGATION SYSTEM

CROSS-REFERENCE TO RELATED APPLICATION

This application claims priority to Japanese Patent Application No. 2023-112124 filed on Jul. 7, 2023, incorporated herein by reference in its entirety.

BACKGROUND

1. Technical Field

The present disclosure relates to a navigation system.

2. Description of Related Art

Japanese Unexamined Patent Application Publication No. 2020-170314 (JP 2020-170314 A) discloses a road abnormality detection device that detects whether there is a road abnormality. This road anomaly detection device detects whether there is a road anomaly based on a video captured by an in-vehicle camera while driving.

SUMMARY

In sections where few vehicles are traveling, videos showing road conditions are less likely to be updated.

The following describes means for solving the above problem and the effects. A navigation system for solving the above problem is a navigation system in which a data center and a plurality of vehicles are connected via a communication network. The data center includes a storage device and a processing device. Each of the vehicles includes a capturing device that is able to capture the video of a road on which the vehicle is traveling and a navigation device. In this navigation system, the processing device is configured to accept specific section information that is able to identify a specific section for which the capturing of road conditions is requested. The processing device is configured to propose capturing-requested routes to a user who performed a route search with a destination set using the navigation device, based on the specific section information. Each of the capturing-requested routes is a route that goes through the specific section. The processing device is configured to store a video together with capturing position information in the storage device. The video is a video uploaded by the user. The video shows the road conditions of the specific section captured by the capturing device while the vehicle was traveling in the specific section. The capturing position information is information that is able to identify a position where the video was captured.

According to this navigation system, videos showing road conditions in sections where few vehicles are traveling are more likely to be updated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

One embodiment of a navigation system will be described with reference to FIG. 1 to FIG. 6.

Configuration of Navigation System 10

Figure 1:
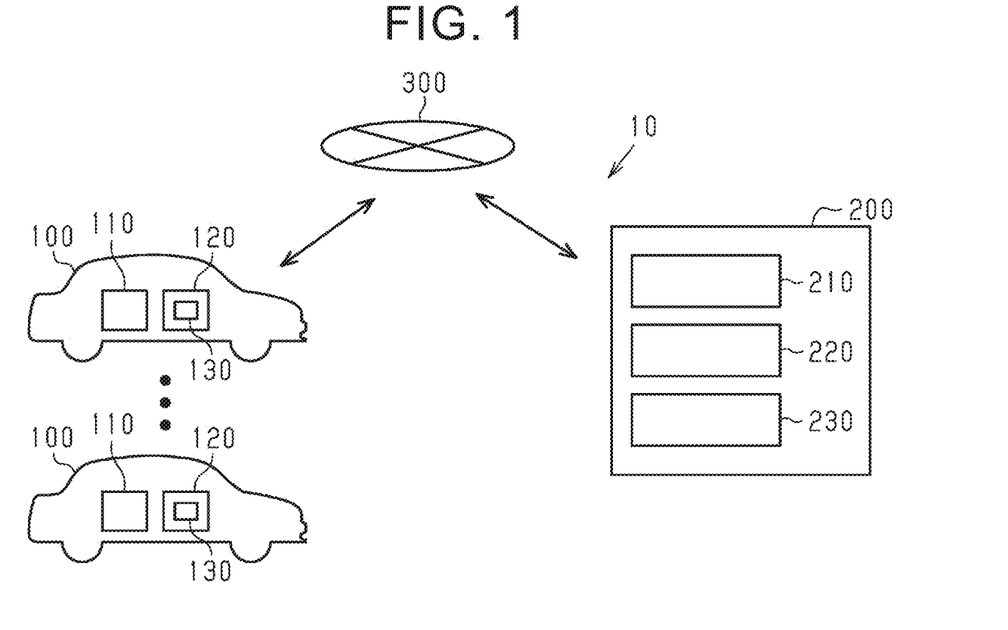
FIG. 1 is a diagram showing a configuration of a navigation system in one embodiment.

As shown in FIG. 1, a navigation system 10 includes a plurality of vehicles 100 and a data center 200. The data center 200 is communicably connected to the vehicles 100 via a communication network 300. Each of the vehicles 100 includes a dashcam 110, which is an example of a capturing device capable of capturing the video of a road on which the vehicle 100 is traveling, and a navigation device 120.

The dashcam 110 is capable of capturing the video ahead of the vehicle 100 as seen from the driver's seat and, in addition, records the captured video. The navigation device 120 includes a satellite positioning system receiver, a communication device, a display 130, an input device, and a storage device that stores data such as map information.

Figure 2:
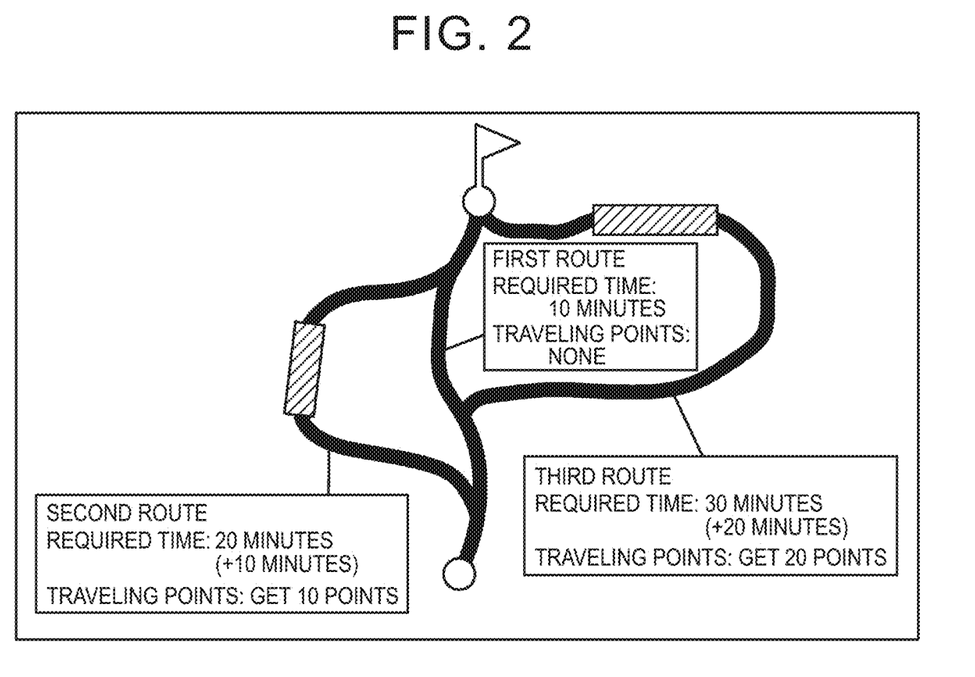
FIG. 2 is a diagram showing an example of a video displayed by a navigation device in the navigation system in the embodiment.

FIG. 2 shows an example of a video displayed by the display 130 of the navigation device 120. As shown in FIG. 2, the navigation device 120 displays route guidance information, which indicates the routes to the destination, on the display 130. The navigation device 120 receives the route guidance information from the data center 200 when the user performed a route search with a destination set.

The dashcam 110 and the navigation device 120 are connected so that they can exchange information with each other. The dashcam 110 stores, in a storage device, the information on the date and time of capturing and the position information on the point where the video was captured, along with the captured video data.

The data center 200 includes a communication device 230. The communication device 230 is implemented as hardware such as a network adapter, various communication software, or a combination thereof. The communication device 230 is configured to carry out wired or wireless communication via the communication network 300. The data center 200 may be configured using a plurality of computers. For example, the data center 200 may be configured with a plurality of server devices.

For example, from the video captured by the dashcam 110, it is possible to understand the road conditions seen from the driver's seat. By receiving the video captured by the dashcam 110 of the vehicle 100, the data center 200 can update the video showing the road conditions of a section in which the vehicle 100 traveled.

Sending and Receiving Information in Navigation System 10

Next, sending and receiving information between a capturing requester 50, the vehicle 100, and the data center 200 will be described with reference to FIG. 3.

Figure 3:
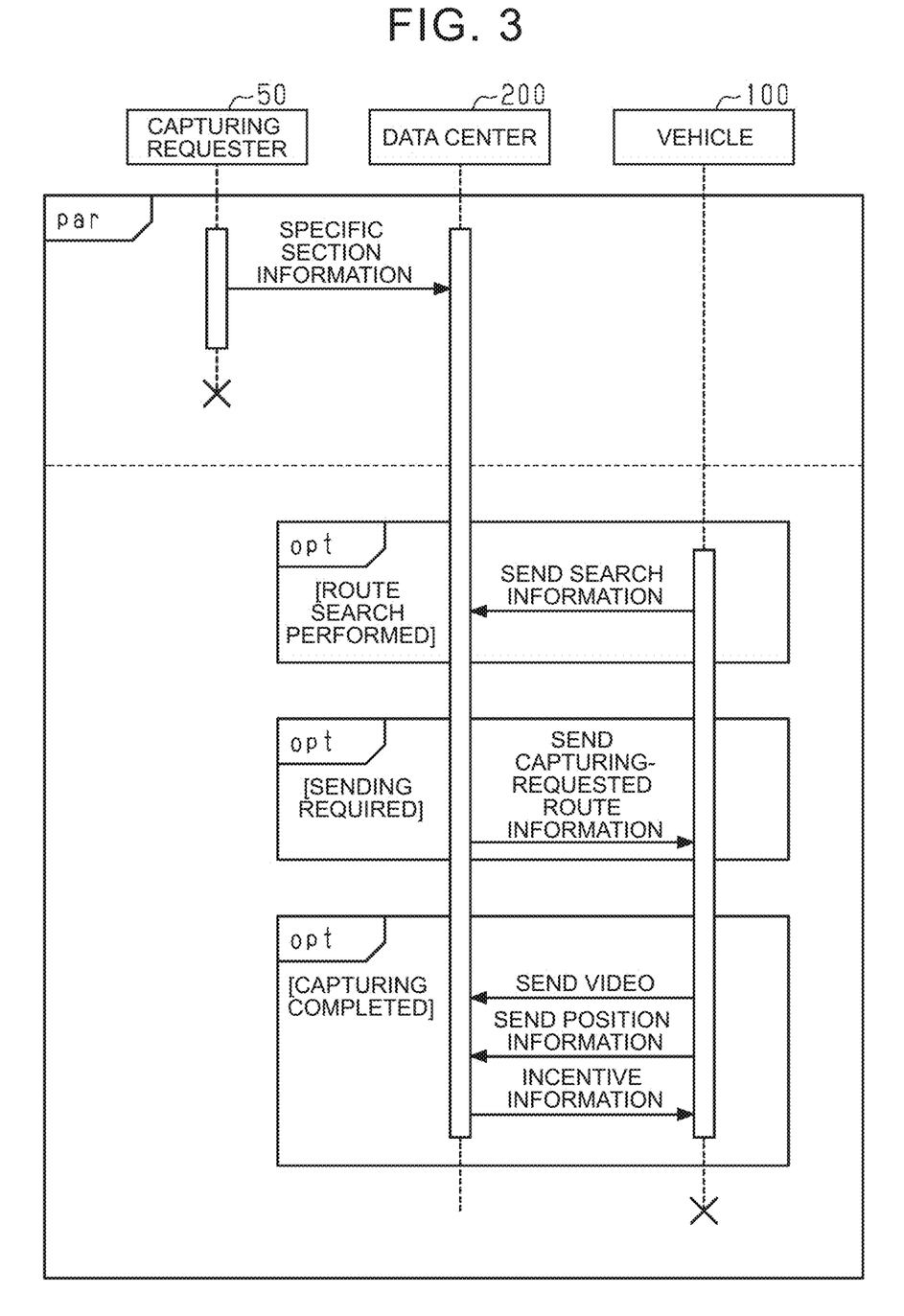
FIG. 3 is a sequence diagram showing a flow of processing performed by a capturing requester, a data center, and a vehicle in the navigation system in the embodiment.

As shown in FIG. 3, the data center 200 receives specific section information from the capturing requester 50 in the navigation system 10. The specific section information is the information that can identify a specific section for which the capturing requester 50 requests the capturing of road conditions.

As shown in FIG. 3, the processing in which the data center 200 accepts specific section information from the capturing requester 50 and the processing in which the data center 200 and the vehicle 100 send and receive various types of information are performed in parallel.

As shown in the upper part of FIG. 3, the data center 200 accepts specific section information from the capturing requester 50. In this processing, the data center 200 accepts specific section information from the capturing requester 50, for example, at any time. Instead of accepting specific section information from the capturing requester 50 at any time, the data center 200 may accept specific section information from the capturing requester 50 for a predetermined period of time. For example, the capturing requester 50 may provide specific section information to the data center 200 via email, telephone, etc. For example, the capturing requester 50 may provide specific section information to the data center 200 via a dedicated application. The data center 200 stores the specific section information, accepted from the capturing requester 50, in a storage device 220.

As shown in the lower part of FIG. 3, the vehicle 100 sends search information to the data center 200. In this processing, when the user performs a route search with a destination set using the navigation device 120, the navigation device 120 sends the search information to the data center 200. The search information includes the current position information indicating the current position of the vehicle 100 in which the route search was performed, the information indicating the set destination, and the setting information. The setting information is the information indicating a distance that was set by the user in advance in the navigation device 120. This setting information is stored in the storage device of the navigation device 120. The data center 200 receives the search information and acquires the information indicating the set destination, the current position information indicating the current position of the vehicle 100 in which the route search was performed, and the distance that was set in advance by the user in the navigation device 120.

When the search information is received, the data center 200 determines whether there is a specific section within the distance, indicated by the setting information, from the current position of the vehicle 100 in which the route search was performed, based on the current position information, the distance indicated by the setting information, and the specific section information. When there is a specific section within the distance, indicated by the setting information, from the current position of the vehicle 100 in which the route search was performed, the data center 200 sends capturing-requested route information to the navigation device 120 of the vehicle 100. The capturing-requested route information includes the information indicating a capturing-requested route from the current position of the vehicle 100 to the destination via the specific section and the information indicating the required time. In addition, the capturing-requested route information includes the information indicating the details of an incentive to be given to a user who uploads a video showing the road conditions of the specific section. By sending such capturing-requested route information to the navigation device 120 of the vehicle 100, the data center 200 proposes the capturing-requested route, which will go through the specific section, to the user who performed the route search. When there is a plurality of specific sections, the data center 200 proposes the capturing-requested routes each going through a specific section that is among the specific sections and is within the acquired distance from the current position of the vehicle 100 in which the route search was performed.

When the capturing-requested route information is received, the display 130 of the navigation device 120 of the vehicle 100 displays the information indicating the capturing-requested route, and the information indicating a normal route that arrives at the destination without going through a specific section, as the route guidance information. In addition, the display 130 displays the details of an incentive to be given to the user who uploads the video showing the road conditions of the specific section.

FIG. 2 shows an example of route guidance information displayed on the display 130. As shown in FIG. 2, the route guidance information includes the information that guides a normal route (first route) that does not go through a specific section (shaded section in FIG. 2) and the information that guides capturing-requested routes (second route and third route) each of which goes through a specific section. As shown in FIG. 2, the route guidance information includes the information indicating, for each route, the time required to arrive at the destination. As shown in FIG. 2, the route guidance information may include the information indicating the difference in time required to arrive at the destination between traveling on the capturing-requested route and traveling on the normal route. As shown in FIG. 2, as the information indicating the details of an incentive to be given when a video showing the road conditions of a specific section is uploaded, the route guidance information includes, for example, the information indicating traveling points to be given to the user. For example, the traveling points to be given as an incentive may be points given to a credit card etc. owned by the uploading user. The incentive is not limited to points, but may be, for example, a gift or a discount coupon given to the uploading user.

When the user who has received a proposal for capturing-requested routes selects a capturing-requested route using the navigation device 120 of the vehicle 100, the navigation device 120 stores, in the storage device, the video captured by the dashcam 110 of the vehicle 100 while the vehicle 100 was traveling in the specific section. In addition, the navigation device 120 of the vehicle 100 stores, in the storage device, the capturing position information that can identify the position where the video, stored in the storage device, was captured.

As shown in FIG. 3, when it is determined that the dashcam 110 has completed capturing the video showing the road conditions of the specific section, the navigation device 120 of the vehicle 100 sends the captured video and the capturing position information to the data center 200. As a result, the video, captured by the dashcam 110 of the vehicle 100 while the vehicle 100 was traveling in the specific section and the capturing position information, are uploaded from the user, who received the proposal for the capturing-requested route, to the data center 200. When the video, captured by the dashcam 110 of the vehicle 100 while the vehicle 100 was traveling in the specific section, and the capturing position information are received, the data center 200 gives an incentive to the user who uploaded the video. In addition, the data center 200 sends the incentive information, which can identify that an incentive has been given, to the navigation device 120 of the vehicle 100. When the incentive information is received, the navigation device 120 of the vehicle 100 displays the incentive information on the display 130.

The flow of processing performed by the data center 200 and the flow of processing performed by the vehicle 100 will be described in more detail below with reference to FIG. 4 to FIG. 6.

Processing Performed by the Data Center 200

Figure 4:
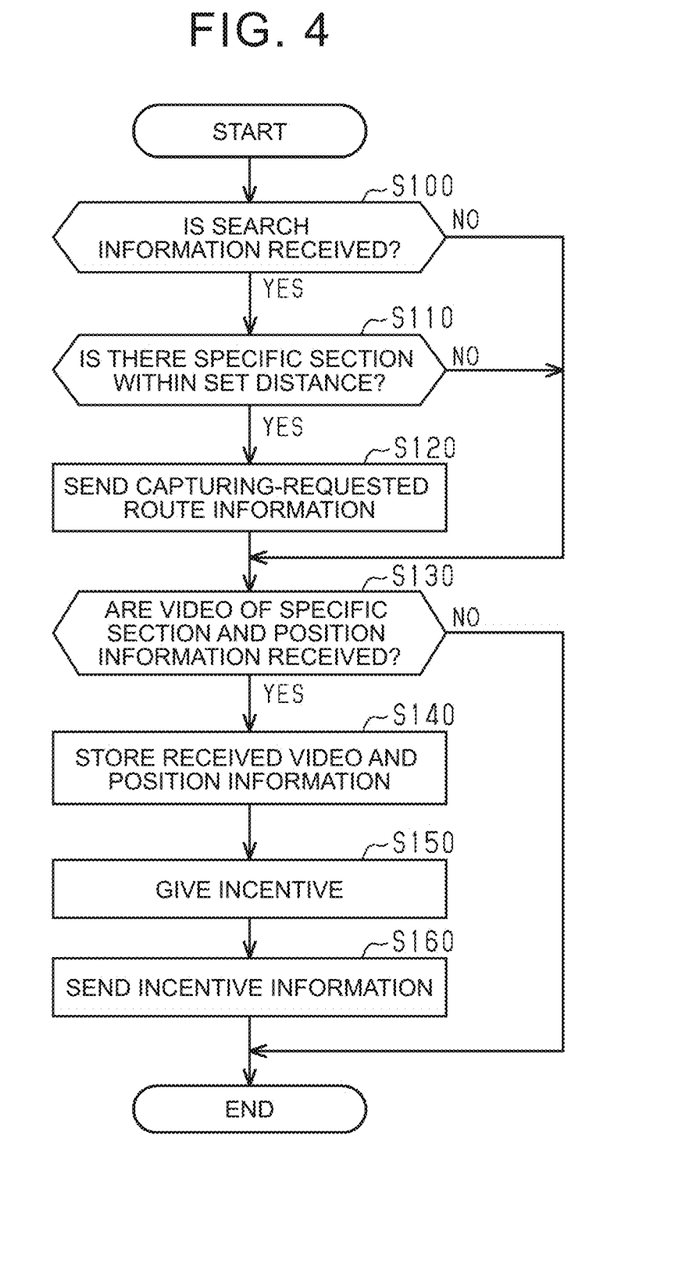
FIG. 4 is a flowchart showing a flow of processing performed after the data center receives specific section information in the navigation system in the embodiment.

FIG. 4 shows the flow of processing that the data center 200 periodically performs at a fixed cycle after receiving specific section information from the capturing requester 50. This series of processing is performed by a processing device 210 of the data center 200. This series of processing corresponds to the processing of the data center 200 shown in FIG. 3.

As shown in FIG. 4, when this series of processing is started, the processing device 210 first determines whether search information is received in the processing in step S100. The search information received by the processing device 210 is the search information received from the vehicle 100 shown in FIG. 3. When the processing device 210 determines in the processing in step S100 that the search information is received from the vehicle 100 (step S100: YES), the processing proceeds to step S110.

In the processing in step S110, the processing device 210 determines whether there is a specific section within the distance set by the user. More specifically, based on the current position information included in the received search information, the distance indicated by the setting information, and the specific section information, the processing device 210 determines whether a specific section is included in its entirety within the distance, indicated by the setting information, from the current position of the vehicle 100. When a specific section is included in its entirety within the distance, indicated by the setting information, from the current position of the vehicle 100, the processing device 210 determines that there is a specific section within the distance set by the user. When part or all of a specific section is included within the distance, indicated by the setting information, from the current position of the vehicle 100, the processing device 210 may determine that the specific section is within the distance set by the user. When the processing device 210 determines that the specific section is within the distance set by the user (step S110: YES), the processing proceeds to step S120.

Next, in the processing in step S120, the processing device 210 sends capturing-requested route information to the navigation device 120 of the vehicle 100. In addition, the processing device 210 sends the normal route information indicating a normal route from the current position of the vehicle 100 to the destination without going through the specific section and the required time to the navigation device 120 of the vehicle 100.

After performing the processing in step S120 to send the capturing-requested route information, the processing proceeds to step S130. In addition, when the processing device 210 does not determine in the processing in step S100 that the search information is received from the vehicle 100 (step S100: NO), the processing device 210 does not perform the processing in steps S110 and S120. In this case, the processing device 210 performs the processing in step S130 without performing the processing in steps S110 and S120. In addition, when the processing device 210 does not determine in the processing in step S110 that there is a specific section within the distance set by the user (step S110: NO), the processing device 210 does not perform the processing in step S120. In this case, the processing device 210 performs the processing in step S130 without performing the processing in step S120. When the processing device 210 does not determine in the processing in step S110 that there is a specific section within the distance set by the user, the processing device 210 sends only the normal route information.

Next, in the processing in step S130, the processing device 210 determines whether the video showing the road conditions of the specific section and the capturing position information indicating the position where the video of the specific section was captured are received. The video showing the road conditions of the specific section is the video captured by the dashcam 110 of the vehicle 100 while the vehicle 100 was traveling in the specific section, and is the video received from the vehicle 100 in FIG. 3. When the processing device 210 determines that the video showing the road conditions of the specific section and the capturing position information indicating the position where the video was captured are received (step S130: YES), the processing proceeds to step S140.

Next, in the processing in step S140, the processing device 210 stores the video showing the road conditions of the specific section, received from the vehicle 100, in the storage device 220, together with the capturing position information, to update the video showing the road conditions of the specific section.

Next, in the processing in step S150, the processing device 210 gives an incentive to the user who uploaded the video showing the road conditions of the specific section. Next, in the processing in step S160, the processing device 210 sends the incentive information, which can identify that the incentive has been given, to the navigation device 120 of the vehicle 100.

After sending the incentive information to the navigation device 120 of the vehicle 100 through the processing in step S160, the processing device 210 ends this series of processing.

When the processing device 210 does not determine in the processing in step S130 that the video showing the road conditions of the specific section and the capturing position information are received (step S130: NO), the processing device 210 does not perform the processing in steps S140 to S160. In this case, the processing device 210 ends this series of processing without performing the processing from step S140 to step S160. That is, when the video showing the road conditions of the specific section and the capturing position information are not received from the vehicle 100, the processing device 210 ends this series of processing without giving any incentive to the user.

Processing Performed by the Navigation Device 120

Figure 5:
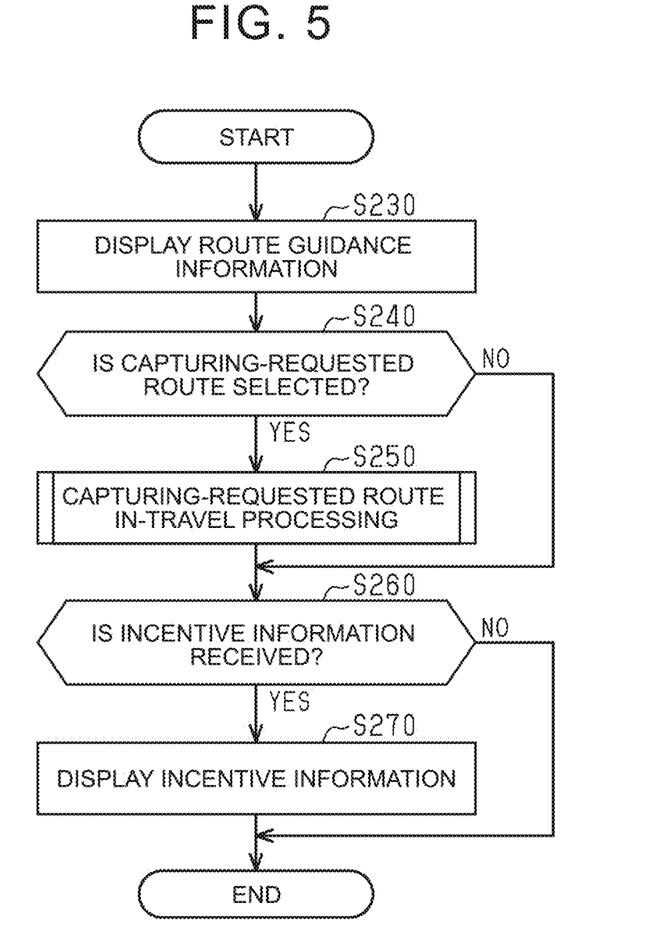
FIG. 5 is a flowchart showing a flow of processing periodically performed by the navigation device of the vehicle in the navigation system in the embodiment.

FIG. 5 shows the flow of processing that the navigation device 120 of the vehicle 100 periodically performs at a constant cycle when capturing-requested route information is received. This series of processing corresponds to the processing of the vehicle 100 shown in FIG. 3.

As shown in FIG. 5, when this series of processing is started, the navigation device 120 first displays the route guidance information on the display 130 in the processing in step S230, based on the capturing-requested route information and the normal route information received from the data center 200.

Next, in the processing in step S240, the navigation device 120 determines whether the user selects a capturing-requested route. For example, the navigation device 120 is preferably configured to allow the user to select a capturing-requested route or a normal route using an input device included in the navigation device 120 while the route guidance information is displayed on the display 130. In the processing in step S240, when the navigation device 120 determines that the user selects a capturing-requested route (step S240: YES), the processing proceeds to step S250.

Next, in the processing in step S250, the navigation device 120 performs capturing-requested route in-travel processing. The capturing-requested route in-travel processing is processing performed by the navigation device 120 for recording video, captured by the dashcam 110 of the vehicle 100 while the vehicle 100 was traveling in the specific section, and the capturing position information and for sending them to the data center 200. Details of the capturing-requested route in-travel processing will be described later.

After performing the capturing-requested route in-travel processing in step S250, the processing proceeds to step S260.

When the navigation device 120 does not determine that the user selects a capturing-requested route in the processing in step S240 (step S240: NO), the navigation device 120 performs the processing in step S260 without performing the processing in step S250.

Next, in the processing in step S260, the navigation device 120 determines whether the incentive information is received. The incentive information is the incentive information sent by the processing device 210 of the data center 200 in the processing in step S160 in FIG. 4. When the navigation device 120 determines that the incentive information is received (step S260: YES), the processing proceeds to step S270.

Next, in the processing in step S270, the navigation device 120 displays the incentive information on the display 130 based on the incentive information received from the data center 200. For example, when points are given as the incentive, the navigation device 120 displays the character string "Points Awarded" on the display 130 as the incentive information. The incentive information displayed on the display 130 is not limited to this, as long as the information can identify that the data center 200 has given the incentive to the user.

After displaying the incentive information on the display 130 in this way through the processing in step S270, the navigation device 120 ends this series of processing. When the navigation device 120 does not determine that the incentive information is received in the processing in step S260 (step S260: NO), the navigation device 120 ends this series of processing without performing the processing in step S270. That is, when the incentive information is not received from the data center 200, the navigation device 120 ends this series of processing without displaying the incentive information on the display 130.

Capturing-Requested Route In-Travel Processing Performed by the Navigation Device 120

Figure 6:
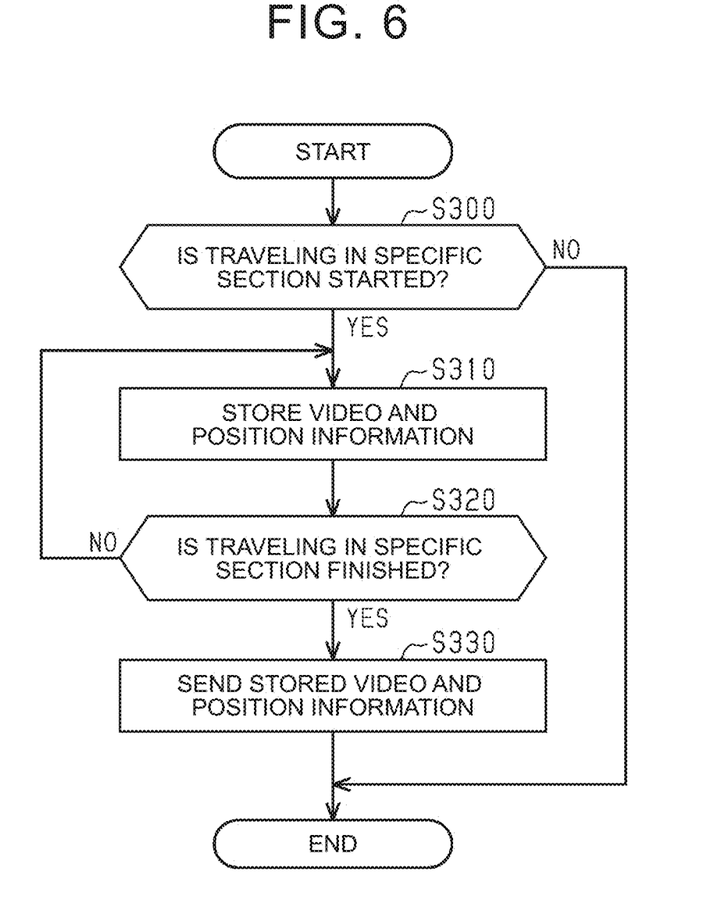
FIG. 6 is a flowchart showing a flow of capturing-requested route in-traveling processing performed by the navigation device of the vehicle in the navigation system in the embodiment.

FIG. 6 shows the flow of capturing-requested route in-travel processing performed by the navigation device 120 of the vehicle 100. This series of processing corresponds to the processing in step S250 shown in FIG. 5.

As shown in FIG. 6, when this series of processing is started, the navigation device 120 first determines, in the processing in step S300, whether the vehicle 100 has started traveling in a specific section. More specifically, the navigation device 120 determines whether the vehicle 100 has started traveling in a specific section, based on the capturing-requested route information received from the data center 200 and the current position information on the vehicle 100 identified by the satellite positioning system. When the navigation device 120 determines that the vehicle 100 has started traveling in the specific section (step S300: YES), the processing proceeds to step S310.

Next, in the processing in step S310, the navigation device 120 stores the video, captured by the dashcam 110 of the vehicle 100, and the capturing position information in the storage device of the navigation device 120.

Next, in the processing in step S320, the navigation device 120 determines whether the vehicle 100 has finished traveling in the specific section. More specifically, the navigation device 120 determines whether the vehicle 100 has finished traveling in the specific section, based on the capturing-requested route information received from the data center 200 and the current position information of the vehicle 100 identified by the satellite positioning system. When the navigation device 120 determines that the vehicle 100 has finished traveling in the specific section (step S320: YES), the processing proceeds to step S330. On the other hand, when the navigation device 120 does not determine that the vehicle 100 has finished traveling in the specific section (step S320: NO), the processing returns to the processing in step S310. That is, the navigation device 120 repeatedly performs the processing in steps S310 and S320 until the navigation device 120 determines, in the processing in step S320, that the vehicle 100 has finished traveling in the specific section.

In the processing in step S330, the navigation device 120 sends the video and the capturing position information, stored in the storage device in the processing in step S310, to the data center 200. The video that is sent to the data center 200 is the video captured by the dashcam 110 of the vehicle 100 while the vehicle 100 was traveling in the specific section and is the video that the data center 200 receives from the vehicle 100 in FIG. 3.

After the video and the capturing position information, stored in the storage device while the vehicle 100 was traveling in the specific section, are sent to the data center 200 through the processing in step S330 as described above, the navigation device 120 ends this series of processing.

When the navigation device 120 does not determine, in the processing in step S300, that the vehicle 100 has started traveling in the specific section (step S300: NO), the navigation device 120 does not perform the processing in steps S310 to S330. In this case, the navigation device 120 ends this series of processing without performing the processing from step S310 to step S330.

Effects of Embodiment

In the navigation system 10, the processing device 210 of the data center 200 performs the processing, described with reference to the upper part of FIG. 3, to accept specific section information that can identify a specific section for which the capturing of road conditions is requested.

Then, the processing device 210 performs the processing in steps S100 to S120 in the series of processing, described with reference to FIG. 4, to propose capturing-requested routes to the user who performed a route search with a destination set using the navigation device 120. Each of the capturing-requested routes is a route that passes through a specific section. The processing device 210 proposes the capturing-requested routes to the user who performed a route search, based on the specific section information.

Then, the processing device 210 performs the processing in steps S130 and S140 in the series of processing, described with reference to FIG. 4, to store the video, uploaded by the user, in the storage device 220. The video uploaded by the user is the video that was captured by the dashcam 110 while the vehicle 100 was traveling in the specific section and that shows the road conditions of the specific section. The processing device 210 stores the video that was uploaded by the user and the capturing position information that can identify the position where the video was captured in the storage device 220.

Then, the processing device 210 performs the processing in step S150 in the series of processing, described with reference to FIG. 4, to give an incentive to the user who uploaded the video showing the road conditions of the specific section.

In this way, the navigation system 10 accepts specific section information that can identify a specific section for which the capturing of road conditions is requested. After that, based on the specific section information, the navigation system 10 proposes capturing-requested routes, each of which goes through a specific section for which the capturing of road conditions is requested, to the user who performed a route search with a destination set using the navigation device 120. Then, the navigation system 10 stores the video showing the road conditions of the specific section captured by the dashcam 110 while the vehicle 100 was traveling in the specific section, along with the capturing position information, in the storage device 220. Then, the navigation system 10 gives an incentive to the user who uploaded the road conditions of the specific section.

Effects of the Embodiment (1) The data center 200 of the navigation system 10 stores, in the storage device 220, a video that was uploaded by the user, that was captured while traveling in a specific section and, that shows the road conditions of the specific section, along with the capturing position information. Then, after identifying that the video is the video of the specific section based on the capturing position information, the navigation system 10 updates the video showing the road conditions of the specific section. In addition, the navigation system 10 proposes capturing-requested routes, each of which goes through a specific section for which the capturing of the road conditions is requested, to the user who performed a route search with a destination set using the navigation device 120. This makes it more likely to capture the videos of specific sections. In this way, according to the navigation system 10, the videos showing the latest road conditions of specific sections are more likely to be updated. This makes it more likely to update the video showing road conditions even in sections where there is little travel.

(2) The navigation system 10 gives an incentive to a user who uploaded a video showing the road conditions of a specific section. Therefore, the navigation system 10 can motivate the user to upload a video showing the road conditions of a specific section.

(3) When proposing capturing-requested routes to the user, the navigation system 10 shows capturing-requested routes and a normal route that does not go through a specific section. In addition, the navigation system 10 shows the details of an incentive that will be given when the user travels a capturing-requested route and uploads the video showing the road conditions of a specific section. This allows the user to consider which route to travel by comparing the capturing-requested routes and the normal route with consideration for the details of the incentive.

(4) When proposing capturing-requested routes to the user, the navigation system 10 shows the details of the incentive as well as the difference in time required to arrive at the destination between traveling on each of the capturing-requested routes and traveling on the normal route. This allows the user to consider which route to take not only by considering the details of the incentive but also by comparing the capturing-requested route and the normal route while taking into account the difference in time required to arrive at the destination.

(5) The navigation system 10 proposes to the user the capturing-requested routes each of which goes through a specific section that is within a user preset distance from the current position of the vehicle 100 at which the route search was performed. This limits the capturing-requested routes to those each of which goes through a specific section within the user preset distance, allowing the user to consider whether to travel on a capturing-requested route. It is therefore possible to suitably propose capturing-requested routes to the user.

Modifications

This embodiment can be modified and implemented as follows. This embodiment and the following modifications can be implemented in combination with each other as long as they are not technically inconsistent.

A video uploaded by the user may be a video captured by the dashcam 110 while traveling in the entire section of a capturing-requested route as long as the video includes a video captured by the dashcam 110 while traveling in a specific section. In this case, the navigation device 120 of the vehicle 100 may send the captured video and the capturing position information to the data center 200 when the vehicle 100 arrives at the destination.

When there is a plurality of capturing-requested routes each of which includes a specific section, the processing device 210 may propose to the user who performed the route search only the capturing-requested route that includes the specific section nearest to the current position of the vehicle 100.

In the navigation system 10 described above, a video uploaded by the user to the data center 200 is a video captured by the dashcam 110. Instead of this, a video uploaded by the user to the data center 200 may be a video captured by a capturing device other than the dashcam 110. An example of a capturing device other than the dashcam 110 is an in-vehicle camera used for driving assistance.

When a plurality of users uploads videos showing the road conditions of the same specific section, the processing device 210 may give an incentive to all users who upload videos before the request to capture the road conditions is withdrawn. In this case, the processing device 210 may also give an incentive only to the user who uploads the video first.

The processing device 210 may grant a right to obtain an incentive only to the first user who selects a capturing-requested route.

The navigation device 120 may show capturing-requested routes and a normal route by video displayed on the display 130, while outputting the details of an incentive by voice. In this case, the navigation device 120 preferably includes the display 130 and a speaker capable of outputting voice.

When an incentive is given, the navigation device 120 does not necessarily need to show the incentive information that can identify that the incentive has been given.

When displaying the route guidance information, the navigation device 120 may show the difference in distance required to arrive at the destination between traveling on a capturing-requested route and traveling on a normal route, along with the details of the incentive.

The processing device 210 may propose a capturing-requested route going through a specific section that is among a plurality of specific sections and is within a distance, preset by the user in the navigation device 120, from any point on the route from the current position of the vehicle 100, in which the route search was performed, to the destination.

What is claimed is:

1. A navigation system in which a data center and a plurality of vehicles are connected via a communication network, the data center including a storage device and a processing device, each of the vehicles including a capturing device that is able to capture a video of a road on which the vehicle is traveling and a navigation device, wherein the processing device is configured to:
   accept specific section information that is able to identify a specific section for which capturing of road conditions is requested;
   propose capturing-requested routes to a user who performed a route search with a destination set using the navigation device, based on the specific section information, the capturing-requested routes each being a route that goes through the specific section; and
   store a video together with capturing position information in the storage device, the video being uploaded by the user, the video showing road conditions of the specific section captured by the capturing device while the vehicle was traveling in the specific section, the capturing position information being information that is able to identify a position where the video was captured;
   wherein the processing device is configured to give an incentive to the user who uploaded the video showing the road conditions of the specific section;
   wherein the processing device is configured to propose the capturing-requested routes to the user along with details of the incentive, the incentive being given when the video showing the road conditions of the specific section is uploaded;
   wherein the navigation device included in the vehicle of the user is configured to show the capturing-requested routes and a normal route, along with the details of the incentive, the normal route being a road that does not go through the specific section, the incentive being given when the video showing the road conditions of the specific section is uploaded; and
   wherein the navigation device is configured to show a difference in time required to arrive at the destination between traveling on the capturing-requested route and traveling on the normal route, along with the details of the incentive.

2. The navigation system according to claim 1, wherein the processing device is configured to:
   acquire current position information and a distance, the current position information indicating a current position of the vehicle in which the route search was performed, the distance being a distance preset by the user in the navigation device; and
   propose the capturing-requested routes each going through the specific section that is among a plurality of the specific sections and is within the distance from the current position of the vehicle in which the route search was performed, based on the current position information and the distance.

* * * * *